United States Patent [19]

Hunter

[11] 4,001,119
[45] Jan. 4, 1977

[54] THICKENING APPARATUS
[76] Inventor: A. Bruce Hunter, 18 W. Park Blvd., Dollard des Ormeaux, Quebec, Canada
[22] Filed: Jan. 31, 1975
[21] Appl. No.: 545,767
[30] Foreign Application Priority Data
Feb. 4, 1974 United Kingdom ............ 04942/74
[52] U.S. Cl. .................................. 210/402; 210/404
[51] Int. Cl.² .................................. B01D 33/06
[58] Field of Search .............. 210/74, 77, 157, 161, 210/386, 397, 402, 404; 162/326, 328, 329, 335, 357

[56] References Cited
UNITED STATES PATENTS

| | | | |
|---|---|---|---|
| 770,307 | 9/1904 | Parker | 162/335 X |
| 917,305 | 4/1909 | Johnson | 210/402 |
| 1,360,684 | 11/1920 | Roberts | 210/402 X |
| 1,859,642 | 5/1932 | Woodworth | 210/402 X |
| 2,289,762 | 7/1942 | Duvall | 210/77 |
| 2,534,760 | 12/1950 | Ellila | 210/402 X |
| 2,669,909 | 2/1954 | Gibson | 210/402 X |
| 2,685,235 | 8/1954 | Lindblad | 210/77 X |
| 2,732,080 | 1/1956 | Strindlund | 210/402 |
| 2,765,085 | 10/1956 | Strindlund | 210/402 X |
| 3,043,742 | 7/1962 | Chaplin | 162/326 X |

FOREIGN PATENTS OR APPLICATIONS 9,439   12/1898   Sweden

Primary Examiner—Charles N. Hart
Assistant Examiner—R. G. Mukai
Attorney, Agent, or Firm—K. M. Hill

[57] ABSTRACT

The following invention discloses improvements in thickening devices used in the art of separating solid particles from liquids in a slurry of such particles and liquid having the method steps of causing an imperfectly filtered filtrate to flow by gravity to one outlet and a more perfectly filtered filtrate to flow by gravity toward another outlet.

1 Claim, 6 Drawing Figures

THICKENING APPARATUS

The present invention relates to an apparatus for separation of solid particles in suspension from liquids, for use mainly, but not necessarily exclusively, in the paper-making process.

FIELD OF INVENTION

In the paper-making process, at various stages of manufacture, it is frequently necessary to thicken the stock, by increasing the concentration of solid particles through removal of a substantial fraction of the water. Further, it is the usual case that the volumes, or flow rates, of said suspension are large, and therefore it is desirable to provide apparatus capable of handling high rates of flow through relatively small apparatus of moderate capital cost. Further, it is clearly desirable that the removed water contain no fibres, or the lowest possible concentration of fibres or solid particles.

PRIOR ART

A well-known type of apparatus for removal of water from paper-making stock, usually called a decker in the industry, consists of a revolving cylinder having a horizontal axis, partially submerged in an open container or vat, of unthickened stock, having its outer cylindrical surface covered with a suitable filtration medium such as a woven-wire mesh. Water is removed by filtration into the interior of the cylinder by gravity and escapes from the interior of said cylinder, also by gravity, through at least one open end of said cylinder, which is sealed by a suitable rotary seal. The thickened stock, adhering loosely to the outer surface, is removed from the cylinder, on each revolution, above the liquid level, typically by contact with a rubber covered transfer roll or "couch roll", from which it is removed, in turn, by a suitable scraper, or "doctor blade".

It is recognized that the well-known decker provides the high flowrates of water removal in an apparatus of relatively small size, and or relatively moderate capital cost. However, the filtration in a decker is not very efficient, in that the filtrate, or "white-water" contains considerable concentration of fibres.

Another well-known type of apparatus for removing water from paper-making stock is the drum filter, one type of which is exemplified by the device disclosed in U.S. Pat. No. 1,859,642 to S. E. Woodsworth, May 24, 1932. In drum filters generally as also in Woodsworth's arrangement specifically it is usual to divide the internal radius of the cylinder which has the filtering medium on its outer surface into a plurality of compartments. These compartments are individually connected by pipes or conduits to a rotary valve. It is usual to arrange the rotary valve such that two filtrate streams are obtained by one having a higher concentration of residual particles than the other since the filtrate obtained from any compartment will contain a higher concentration of particles during the first part of its submerged path of rotation than during the latter part. It is usual to provide at least one, and sometimes two, vacuum pumps to cause the filtrate to be evacuated from the compartments through the rotary valve. The drum filter has the advantage over the decker in that the second filtrate stream has a greatly reduced concentration of residual particles than does the single filtrate stream from the decker, and that the first filtrate stream may, if desired, be refiltered. However, compared to the decker, the drum filter is much higher in capital cost than the decker for a given thruput, requires greater floor space and more maintenance and attention because of the necessity of including the rotary valve and the vacuum pump or pumps.

The present invention discloses an apparatus for water removal from paper making stock, having the small size, moderate capital cost, and structural and operating simplicity of a decker, but with the novelty of producing two filtrate streams, the second of which consists of white water having greatly reduced fibre concentration comparative to the known art. As with the drum filter, the first or rich filtrate stream which, as with the drum filter, contains an increased concentration of particles, may if desired be re-filtered. In the present invention, the two filtrate streams are separated from each other by the effect of gravitational pull within the thickness of the hollow cylinder wall itself, without the need of a rotary or other automatic valve, and without the need of vacuum or other pumps. More specifically the present invention comprises the employment of apparatus in the form of horizontal cylinder-filter means having a plurality of longitudinally extending compartments or chambers in parallel helicoidal array against the inner surface of a cylindrical filter and between said surface and an imperforate co-axial inner cylinder surface, to rotate with said cylinder-filter means which are partly immersed in the suspension to be filtered. As a result the filtrate is caused to flow solely by gravity and without the necessity for expensive pumps, valving and the like downwardly along and through the length of said compartments with the filtrate which is filtered through said apparatus on the down-running side thereby being conveyed downwardly to one end, and that on the up-running side downwardly to the opposite end.

With the foregoing objects in view, the present invention is exemplified in the following embodiment, reference being had to the accompanying drawings, in which:

FIG. 6 shows a flattened development view of one of the division plates of FIG. 5, and its relationship to adjacent elements.

In the drawings, like characters of reference designate similar parts in the several Figures.

PREFERRED EMBODIMENT OF THE INVENTION

Figure 1:
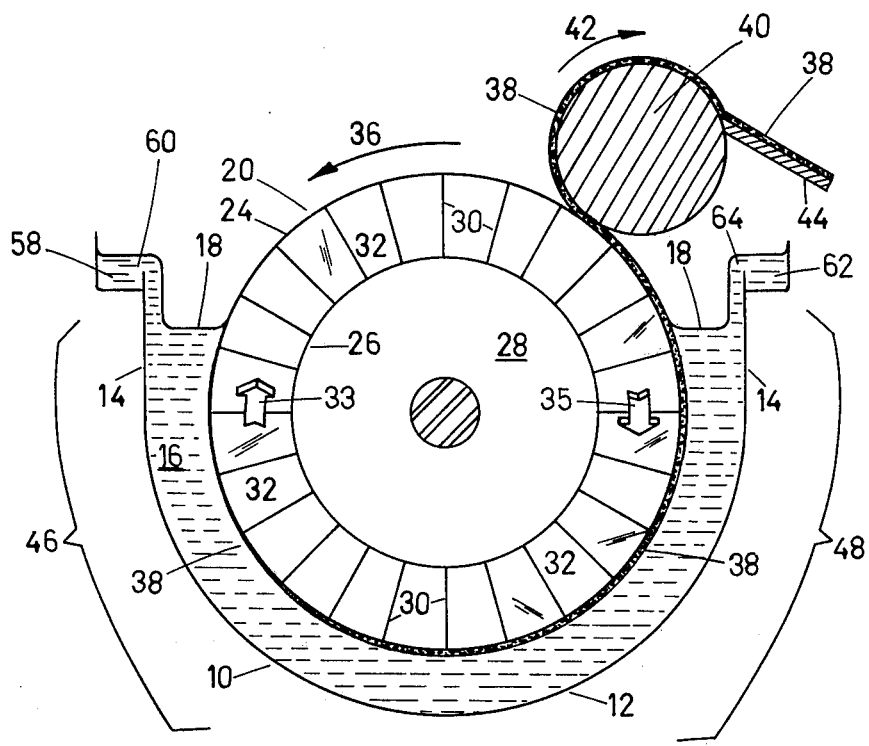
FIG. 1 is a vertical section, approximately along line 1—1 of FIG. 2, showing one embodiment of the invention.

An imperforate, rigid vat, 10, supported by any suitable frame structure (not shown) may advantageously, although not necessarily, include an arcuate bottom portion 12 and vertical side portions 14, and contains a liquid suspension 16 of particles which it is desired to thicken, up to a liquid surface 18. Partially submerged in said liquid suspensions 16 are cylinder means comprising essentially a cylindrical filter or cylinder mold 20, mounted with its axis horizontal upon a shaft 22, coaxial with it, and shaft 22 is journalled in conventional bearings, (not shown) and driven by suitable mechanical means, (not shown) for rotation about its own axis. The mold or outer surface of cylinder 20 is covered with a suitable filter medium 24, such as, for example, woven wire cloth, which, in turn, is supported by conventional perforated means, (not shown in detail.) Concentric with the outer surface of cylinder 20, is an inner or internal, imperforate, generally cylindrical shell 26, which may be supported from shaft 22 by any suitable means such as radial arms (not shown) extending between shaft 22 and shell 26. At each end of the cylinder, the space between shaft 22 and shell 26 is imperforately closed by blanking plates 28.

Figure 2:
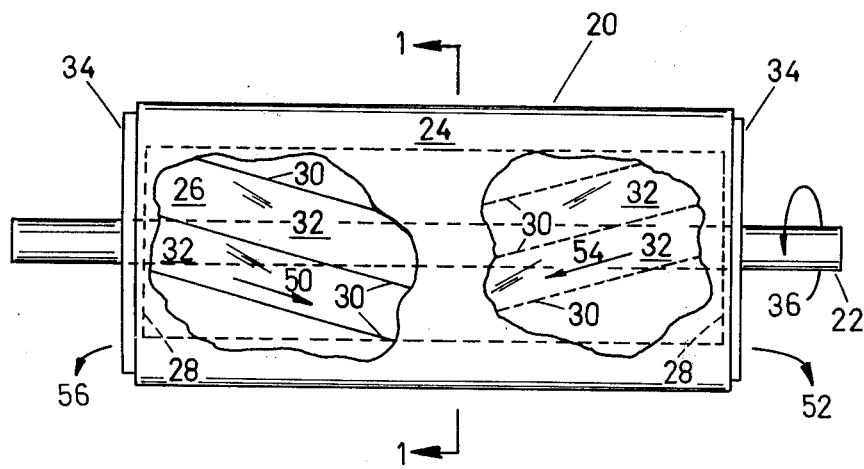
FIG. 2 is a side elevation, partly in section, of one portion of the invention, that is, the cylinder of FIG. 1.

Filtrate is conveyed along a helicoidal path about axis 22 from vat 10 to a sink (not shown): In the embodiment shown in FIGS. 1 and 2, a plurality of imperforate division plates or partitions 30, are provided extending between shell 26, and the conventional perforated means supporting filter medium 24. As best seen in FIG. 2, division plates 30 arranged helically about the axis of the cylinder, but, as best seen in FIG. 1, are radial along any plane perpendicular to the axis of the cylinder 20. The division plates 30 divide the annular space between shell 26 and filter medium 24 with its supporting perforate means, into a plurality of elongated helicoidal, or at least generally helicoidal passages or compartments 32, extending in the manner of a screw thread of very long pitch as indicated by strap-arrows 33 and 35, from one end of cylinder 20 to the other. Each passage 32 is defined by a portion of shell 26, a portion of filter medium 24 and supporting perforate means, and by two adjacent helical division plates 30. Each passage, 32, has both ends open, one at each end of cylinder 20. The two ends of cylinder 20 are provided with seal rings 34 which are contacted and sealed by conventional rotary seals or deckle straps in such manner that any liquid flowing to one end or the other of any helicoidal passage 32 may leave the interior of cylinder 20. The reason the expression "generally helicoidal" is used is because in practice the plates (or partitions) 32 may be formed out of flat plate stock out of which the required curves are cut to fit the outer cylindrical surface 20 and the shell 26. The partitions therefore, while diagonal to axial planes of the cylinder and shell embrace the former in "flat" condition and hence are without the curvature characterizing helixes having progressively pitched turns.

In operation cylinder 20 is caused to rotate in the direction shown by arrow 36. As it rotates, some of the liquid from liquid suspension 16 flows through the filter medium 24, leaving solid particles upon the surface of filter medium 24, in the form of a mat, 38, of thickened stock, which adheres loosely to the surface. After rising above the liquid surface 18, mat 38 is contacted by transfer roll or couch roll 40, to which it preferentially adheres, and from which it is removed by scraper or doctor blade 44, as couch roll 40 rotates in the direction shown by arrow 42.

As is well known, the filtrate, or "white-water" passing through filter medium 24 in the region 46, will constitute "rich filtrate" due to containing more fibres than that passing through into the "lean filtrate" region 48, for, as mat 38 increases in thickness, the mat itself becomes a more efficient filter medium. As will be apparent from the Figures, the filtrate from region 46 flows in the direction of arrow 50 to emerge from one end of the cylinder as rich white-water, 52, or white-water containing an appreciable amount of fibres, while the filtrate from region 48 flows in the direction of arrow 54, to emerge from the opposite end of the cylinder as lean white-water, or white-water containing few or no fibres, 56.

Incoming stock may be fed to the interior of vat 10 through distribution trough 58 over weir crest 60. In some applications, it may be possible to use rich white-water 52 in the mill process, and thus recover the fibres. Where it is desired to recover all the fibres, in the apparatus of the present invention, the rich white-water 52 may be returned to vat 10 by an external pump, of conventional design, through second distribution trough 62 over weir crest 64, adjacent to region 48.

Thus, by the present invention, stock may be thickened with more efficient fibre recovery while using simpler apparatus than has hitherto been possible.

Figure 3:
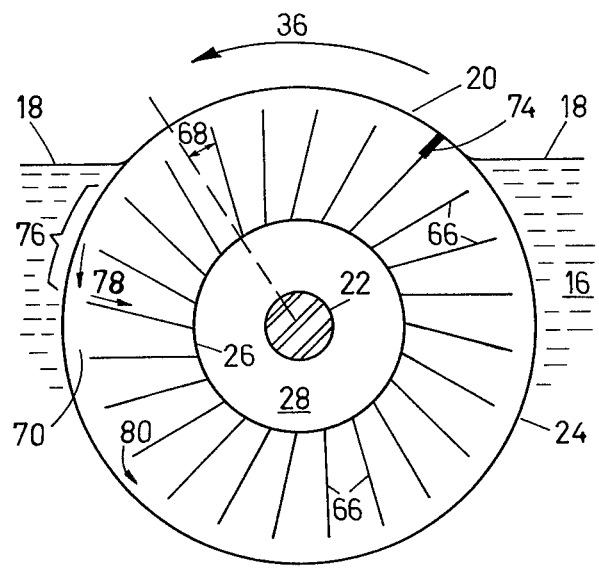
FIG. 3 illustrates a second embodiment of the invention, being a transverse vertical section of one portion of the invention, that is, the cylinder.
Figure 4:
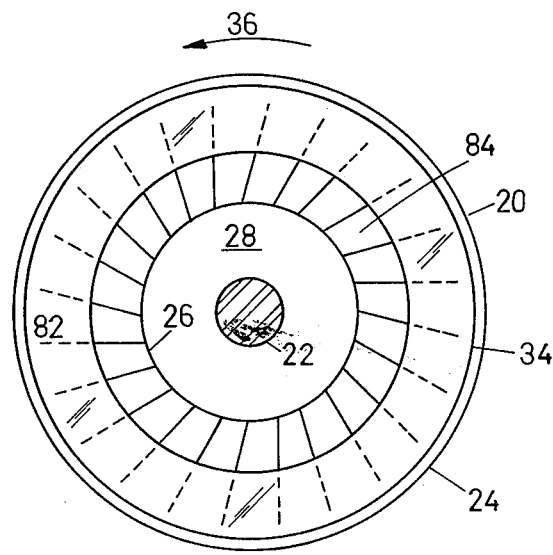
FIG. 4 is an end elevation of the cylinder of the embodiment illustrated in FIG. 3.

FIGS. 3 and 4 illustrate the cylinder 20, of a second embodiment, which will be advantageous in many applications, where a mat 38 forms an efficient filter medium quite rapidly. Thus, it is desirable to use only a small portion of the submerged periphery of cylinder 20 to filter rich white-water which will subsequently be returned to the vat through distribution trough 58. In this embodiment, the dividing plates, or partitions renumbered 66 in FIGS. 3 and 4, while arranged in generally helicoidal array as in the first embodiment are not radial along a plane perpendicular to the axis of the cylinder, but form an acute angle, 68, with a radial line. Hence, although the partitions 66 are not geometrically radial as in the first embodiment they nevertheless radiate (angularly) outwards from shell 26. Furthermore, they are spaced at their outer edges from filter medium 24, leaving a gap 70, except for a plurality of axially narrow projections, here shown diagrammatically as 74, which provide support for filter medium 24 and its supporting perforate means. The end of cylinder 20 through which rich white-water 52 flows is additionally provided with stationery blanking ring or plate 82, leaving openings 84 radially adjacent to cylindrical shell 26, through which rich white-water 52 may pass.

In operation of this embodiment, rich white-water is taken only as the filtrate passes through region 76, which is of limited vertical extent, and this filtrate follows the path depicted by arrows 78, thence along division plates 66, to emerge as rich white-water 52 through openings 84. Any filtrate passing below the limited vertical extent of region 76 will be spilled from the outer edge of division plates 66, through gap 70, as depicted by arrow 80, to the bottom of the interior of the cylinder, where it will be prevented from emerging with rich white-water 52 by blanking ring 82, and therefore must emerge with lean white-water 56 from the opposite end of the cylinder, where there is no blanking ring.

By suitable choice of angle 68, and gap 70, the depth of region 76 may be selected to suit the needs of the particular application.

It will be apparent that a practical limit will be found to the axial length of cylinder mold 20, or to the rotative speed of the said cylinder mold, in that time must be provided for droplets of filtered water which have entered from region 76, and which therefore constitute rich white-water as described herein, to flow by gravity throughout the axial length of cylinder 20 and out through openings 84, before cylinder 20 has rotated through a sufficient angle that the rich whitewater spills off the outer edge of division plates 66 as depicted by arrow 80 in FIG. 3.

Figure 5:
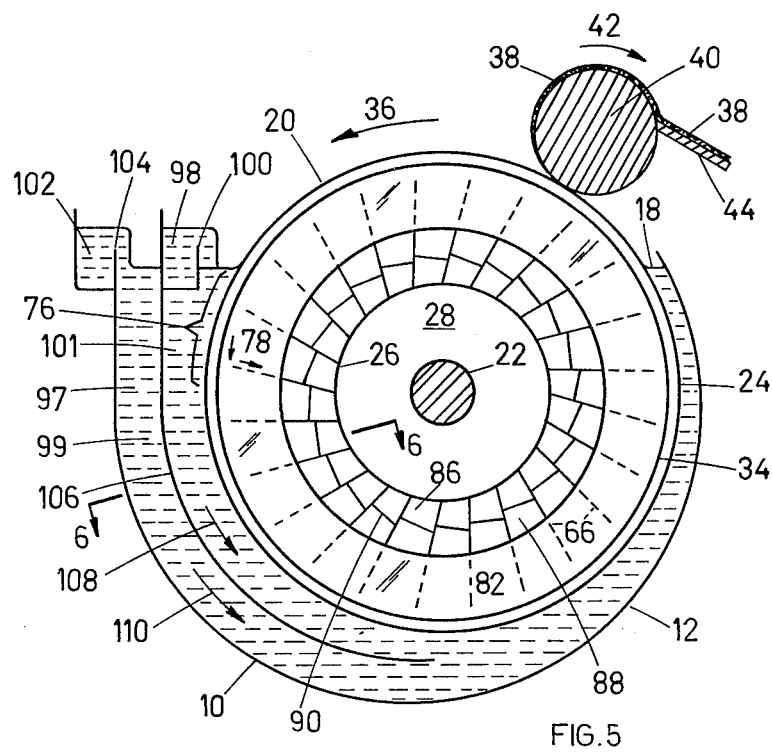
FIG. 5 is an elevation of a cylinder of a different embodiment than of FIG. 4, with a vertical section as in FIG. 1 showing variants in the vat.
Figure 6:
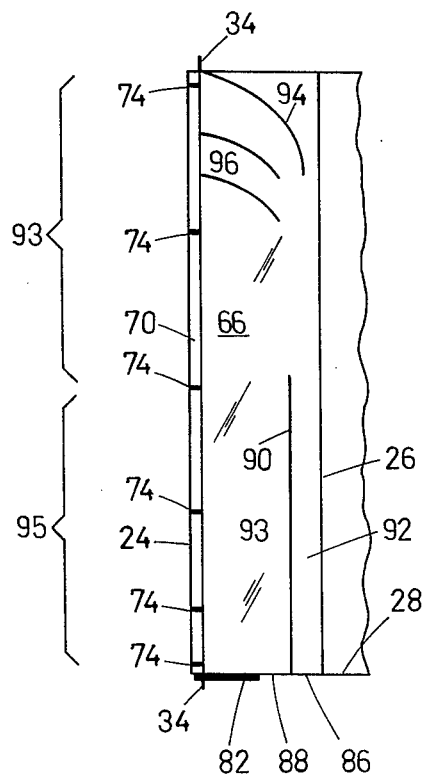
FIG. 6 is a partial section, taken along the line 6—6 of FIG. 5.

FIGS. 5 and 6 illustrate a further embodiment, in which either the axial length of cylinder 20 may be increased, or its rotative speed increased. Additionally, a semi-partition or channel plate 90 may be provided between each adjacent pair of division plates 66, imperforately defining an outer and inner sub-compartments 92 and 93 respectively between channel plate 90, shell 26, and a pair of adjacent division plates 66. As may best be seen in FIG. 6, the channel plate 90, and hence channel 92 extends from the rich whitewater end, only about half the axial length of cylinder 20. Referring to FIG. 5, it will be seen that the cylinder 20, when viewed from the rich whitewater outlet end, now shows a plurality of inner openings 86, and a plurality of outer openings 88, in place of the openings 84 as depicted in FIG. 4.

In operation of the embodiment depicted in FIGS. 5 and 6, rich whitewater entering from region 76 along that part of the length of cylinder 20 shown as 93 in FIG. 6, will flow as depicted by arrows 78 until it reaches shell 26, thence axially along the length of the cylinder, being confined within channel 92 for the latter part of its travel and eventually out through opening 86. Once it has been confined within channel 92, it can continue along its path to opening 86, even though the cylinder 20 has by this time rotated sufficiently that the division plate 66 on which it rests has by this time passed the horizontal. The rich whitewater from region 76 which enters along the remaining length of the cylinder shown as 95 in FIG. 6 flows as depicted by arrows 78 only until it reaches the radially outer face of channel plate 90, and thence axially along until it escapes from opening 88.

Optionally, a curved end baffle 94 may be provided, at the extreme end of each division plate 66, so that, for that portion of the rich whitewater which has the farthest to travel to reach opening 86, the substantially radial inward velocity of its travel as depicted by arrows 78 will be efficiently redirected axially along the length of cylinder 20 toward opening 86. This will permit a further small improvement in rotative speed. Optionally also, one or a plurality of curved intermediate baffles 96 may also be provided.

In FIG. 5 a variation in the construction of vat 10 by the substitution therefore of volute, substantially form-fitting vat 97 divided into compartments 99 and 101. The inlet means to vat 10 may be used with any of the cylinder embodiments disclosed herein. As shown, two distribution troughs, 98 and 102 are provided adjacent to each other, and both on the down-running side. Two different feed stock supplies may thus be fed, over weir crests 100 and 104 respectively, but they are prevented from mixing over part of the submerged travel of the surface of cylinder 20, by separating wall 106. Various operating strategies are thus possible. It is apparent that the incoming stock to be thickened may be fed through trough 98, and returned rich whitewater through trough 102. Alternatively, a portion of the incoming stock to be thickened may be enriched by already thickened stock or "sweetener stock" returned from a portion of the mat 38 removed by the doctor blade 44. This will permit the rapid formation of a filtering mat during the early part of submerged travel of filter medium 24 through region 76. The balance of the incoming stock, to which, if desired, may be added the returned rich whitewater 52, may be fed through trough 102. A third distribution inlet may be added, and thereby, any point on filter medium 24 may be caused, throughout its submerged travel, to contact, successively, sweetener stock, unthickened feed stock, and returned rich whitewater. Various alternate feed distribution methods, and operating strategies, suitable for different types of slurries, will readily be apparent to those skilled in the art.

Various modifications can be made within the scope of the inventive concept which is disclosed and/or claimed. Accordingly, it is intended that what is set forth herein should be regarded as illustrative of such concept, and not for the purpose of limiting the inventor's claim or claims for protection to any particular embodiment or feature thereof, and that only such limitations should be placed upon the scope of protection to which the inventor hereof is entitled, as justice dictates.

What is claimed is:

1. A filtering device for separating solid particles from liquid in a slurry of said particles and liquid when substantially immersed in said slurry comprising in combination; axially horizontal and rotatable cylinder-filter means embodying essentially in co-axial relationship therewith, a plurality of longitudinally extending and helicoidally parallel compartments extending from end to end circumferentially contiguous to the inner surface of said cylinder-filter means, those of said compartments upon one side of the vertical axial plane of said cylinder-filter means conveying rich filtrate by gravity to one end of said cylinder-filter means, those compartments upon the other side of said vertical axial plane conveying lean filtrate by gravity to the opposite end of said cylinder-filter means; said cylinder-filter means including in co-axial relationship, an outer cylindrical filter and an inner cylindrical shell, said compartments being circumferentially bounded by said filter and shell and generally radially bounded by elongated generally helicoidal partitions extending between said filter and said shell, and including semi-partition in substantially all of said helicoidal compartments to separate one end of such compartments into inner and outer sub-compartments wherein said inner sub-compartments are closer to the axis of said cylinder-filter means and said outer sub-compartments are more distant therefrom whereby filtrate trapped in said inner sub-compartments will be conveyed to said one end irrespective of the rotational position of said cylinder-filter means.

* * * * *